(12) United States Patent
Ebitani et al.

(10) Patent No.: US 8,749,854 B2
(45) Date of Patent: Jun. 10, 2014

(54) IMAGE PROCESSING APPARATUS, METHOD FOR PERFORMING IMAGE PROCESSING AND COMPUTER READABLE MEDIUM

(75) Inventors: Kenji Ebitani, Ashigarakami-gun (JP); Takeshi Noguchi, Ashigarakami-gun (JP); Hirofumi Komatsubara, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1314 days.

(21) Appl. No.: 12/554,505

(22) Filed: Sep. 4, 2009

(65) Prior Publication Data

US 2010/0134851 A1 Jun. 3, 2010

(30) Foreign Application Priority Data

Dec. 3, 2008 (JP) ................................. 2008-308749

(51) Int. Cl.
*H04N 1/04* (2006.01)
*G06K 19/06* (2006.01)
(52) U.S. Cl.
USPC .............. 358/474; 358/448; 355/40; 235/494
(58) Field of Classification Search
USPC ....................................................... 358/474
See application file for complete search history.

(56) References Cited

U.S. PATENT DOCUMENTS

| 2003/0042319 A1* | 3/2003 | Moore | 235/494 |
| 2004/0109147 A1* | 6/2004 | Redd et al. | 355/40 |
| 2004/0128555 A1* | 7/2004 | Saitoh et al. | 713/201 |

FOREIGN PATENT DOCUMENTS

| JP | 10-23180 A | 1/1998 |
| JP | 2000-353171 A | 12/2000 |
| JP | 2002-024258 A | 1/2002 |
| JP | 2002-312385 A | 10/2002 |
| JP | 2004-192610 A | 7/2004 |
| JP | 2004-280654 A | 10/2004 |

OTHER PUBLICATIONS

Notification of Reason for Refusal dated Nov. 16, 2010, issued in corresponding Japanese Application No. 2008-308749.

* cited by examiner

*Primary Examiner* — Thomas D Lee
*Assistant Examiner* — Pawandeep Dhingra
(74) *Attorney, Agent, or Firm* — Sughrue Mion, PLLC

(57) ABSTRACT

An image processing apparatus includes an image reception unit, a determination unit, a display unit, a correction accepting unit and a criterion modifying unit. The image reception unit receives a plurality of images. The determination unit determines whether each image received by the image reception unit corresponds to a separator image that represents a separator of a document based on a criterion and outputs a detection result. The display unit displays the detection result output by the determination unit. The correction accepting unit accepts correction of the displayed detection result in accordance with an operation performed by a user. The criterion modifying unit modifies the criterion based on the accepted correction. The determination unit re-determines whether each image received by the image reception unit corresponds to the separator image based on the criterion after the criterion is modified by the criterion modifying unit.

14 Claims, 8 Drawing Sheets

IMAGE PROCESSING APPARATUS, METHOD FOR PERFORMING IMAGE PROCESSING AND COMPUTER READABLE MEDIUM

CROSS-REFERENCE TO RELATED APPLICATIONS

This application is based on and claims priority under 35 USC 119 from Japanese Patent Application No. 2008-308749 filed Dec. 3, 2008.

BACKGROUND

1. Technical Field

This invention relates to an image processing apparatus, a method for performing image processing and a computer readable medium storing a program that causes a computer to execute image processing.

2. Related Art

There is a technique for scanning plural paper documents to generate image data by a scanner equipped with an automatic sheet feeder. There has been proposed a method in which separate electronic documents are created for respective paper documents when scanning the paper documents. In this regard, for example, following two methods are known:

(1) A first method in which a separator sheet that is different from documents is inserted in a separator position of a document (e.g., in the forefront or rearmost position of one set of sheets to be regarded as a single document), and the separator sheet is detected when scanned so as to distinguish each document.

(2) A second method in which such separator sheet is not used for determining the separator position of documents. For example, a size, a layout, a symbol or the like included in an image and different among documents is recognized, or character information (such as information that a character frequently appearing on a cover sheet is included or not) obtained by character recognition technique or the like is used for distinguishing each document.

SUMMARY

According to an aspect of the invention, an image processing apparatus includes an image reception unit, a determination unit, a display unit, a correction accepting unit and a criterion modifying unit. The image reception unit receives a plurality of images. The determination unit determines whether or not each of the images received by the image reception unit corresponds to a separator image that represents a separator of a document based on a criterion and outputs a detection result. The display unit displays the detection result output by the determination unit. The correction accepting unit accepts correction of the detection result displayed by the display unit in accordance with an operation performed by a user. The criterion modifying unit modifies the criterion based on the correction accepted by the correction accepting unit. The determination unit re-determines whether or not each of the images received by the image reception unit corresponds to the separator image based on the criterion after the criterion is modified by the criterion modifying unit.

BRIEF DESCRIPTION OF THE DRAWINGS

Exemplary embodiments of the invention will be described in detail based on the following figures, wherein.

DETAILED DESCRIPTION

Hereinafter, an exemplary embodiment of the invention will be described with reference to accompanying drawings.

Figure 1:
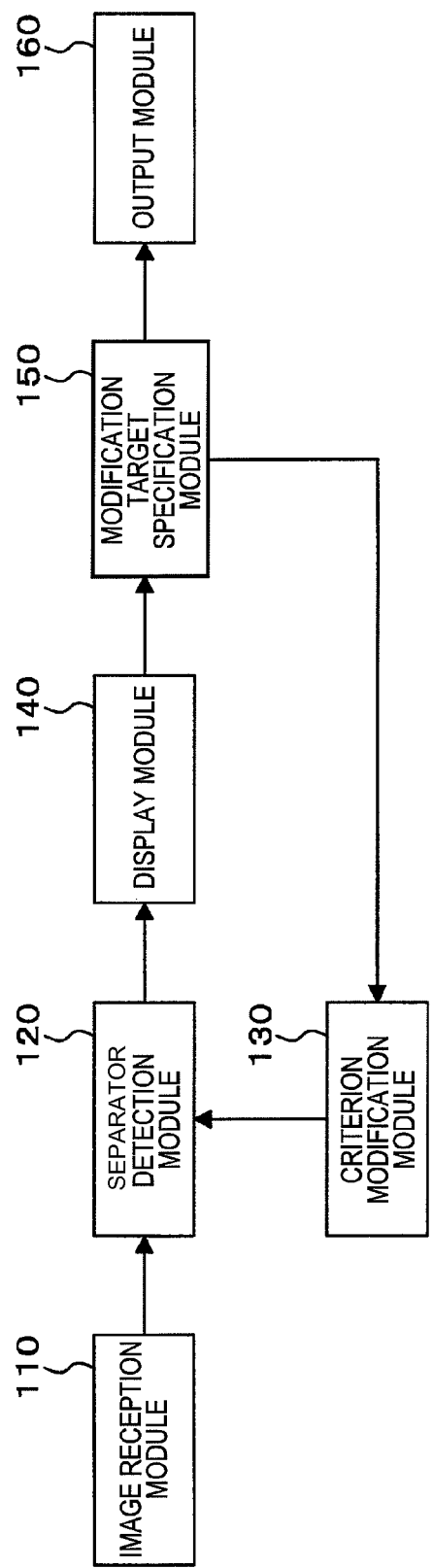
FIG. 1 is a diagram illustrating a configuration of conceptual modules for an exemplary configuration according to an exemplary embodiment of the invention.

FIG. 1 is a diagram illustrating a configuration of conceptual modules for an exemplary configuration according to the exemplary embodiment.

It is noted that a term "module" is used to represent a component of software (a computer program), hardware or the like that can be generally logically separated. Accordingly, the term "module" used in the exemplary embodiment means not only a module of a computer program but also a module used in a hardware configuration. Therefore, the description of the exemplary embodiment also serves as the description of a computer program, a system and a method. Although phrases "to store", "to be stored" or equivalent phrases are used for the convenience of explanation, these terms are to be interpreted as "to store something in a memory device" or "to control a memory device to store something" when the description of the exemplary embodiment is applied to the computer program. Furthermore, although each module corresponds to each function in substantially one-to-one correspondence, one module may be constituted by one program, plural modules may be constituted by one program or one module may be constituted by plural programs in actual application. Moreover, plural modules may be executed by one computer or one module may be executed by plural computers disposed in distributed or parallel environment. It is noted that one module may include another module. Furthermore, a term "connection" is herein used for physical connection as well as logical connection (such as relationships for receiving/sending data, issuing/receiving instructions and referring data).

Also, a system or an apparatus may be constituted by plural computers, hardware and apparatuses connected to one another through a communication means such as a network (including communication connection in one-to-one correspondence) or may be realized by one computer, hardware, apparatus or the like. The term "apparatus" and the term "system" are herein used as substantially synonyms. An expression "predetermined" means "being determined before objective processing" and is used also with meanings of not only "being determined before starting processing of the exemplary embodiment" but also "being determined depending upon current or precedent situations/conditions even after starting processing of the exemplary embodiment".

An image processing apparatus of the exemplary embodiment divides plural images into documents by detecting an image corresponding to a document separator and correcting the detection through an operation performed by a user, and includes, as illustrated in FIG. 1, an image reception module 110, a separator detection module 120, a criterion modification module 130, a display module 140, a modification target specification module 150 and an output module 160.

The image reception module 110 is connected to the separator detection module 130. The image reception module 110 receives plural images and passes the images to the separator detection module 130. Accepting images includes, for example, scanning images with a scanner, receiving images with a facsimile, obtaining images from, for example, an image database, or the like. The exemplary embodiment is particularly suitable for a case where a large number of images are read with a scanner by using an automatic sheet feeder. An image may be a binary image or a multilevel image including a color image. Also, the content of an image may be a document used for business or the like, an advertising brochure or the like.

Furthermore, images to be accepted include plural documents. One document includes continuous images, whereas one document may include merely one image.

As a document separator, for example, a separator sheet different from a document may be inserted in the forefront or rearmost position of each document. Instead of such a separator sheet, a separator may be indicated by a size, a layout, a symbol or the like included in an image different among documents. For example, a symbol included in an image may be a stamp or the like placed on the forefront page of a document (an image including a stamp imprint image).

The separator detection module 120 is connected to the image reception module 110, the criterion modification module 130 and the display module 140. The separator detection module 120 determines whether or not each of the images accepted by the image reception module 110 is an image corresponding to a document separator, and passes the result of the determination to the display module 140. The determination is made based on a predetermined criterion. The criterion can be modified by the criterion modification module 130. After the criterion is modified by the criterion modification module 130, the separator detection module 120 determines again whether or not each of the images accepted by the image reception module 110 is an image corresponding to a document separator.

The determination may be performed by detecting a separator sheet inserted in the forefront or rearmost position of a document, or when such a separator sheet is not inserted, by detecting a size of the image, by detecting a layout (in which large characters are arranged in an uppermost portion of the image or multiple columns peculiar to a first page is employed), by detecting a symbol included in the image, or by detecting, through character recognition, an image including a large number of characters highly frequently appearing on a forefront page. In the following exemplary case, it is assumed that the determination is performed by detecting an image including a stamp imprint image. In other words, it is assumed in the following exemplary case that a stamp is placed on the forefront page of each document.

The criterion modification module 130 is connected to the separator detection module 120 and the modification target specification module 150. The criterion modification module 130 modifies, based on correction accepted by the modification target specification module 150, the criterion employed for determining whether or not an image corresponds to a document separator by the separator detection module 120.

When an image not corresponding to a document separator is modified to an image corresponding to a document separator through the correction accepted by the modification target specification module 150, the criterion employed for determining whether or not an image corresponds to a document separator by the separator detection module 120 may be modified so that more images can be discriminated to correspond to a document separator.

Alternatively, when an image corresponding to a document separator is modified to an image not corresponding to a document separator through the correction accepted by the modification target specification module 150, the criterion employed for determining whether or not an image corresponds to a document separator by the separator detection module 120 may be modified so that fewer images can be discriminated to correspond to a document separator.

The display module 140 is connected to the separator detection module 120 and the modification target specification module 150. The display module 140 displays the detection result obtained by the separator detection module 120 on a display or the like included in the image processing apparatus. Then, the display module 140 informs the modification target specification module 150 of the display, and processing of the modification target specification module 150 is performed after the processing of the display module 140.

Furthermore, when images discriminated to correspond to document separators are displayed and one of the images is selected, the display module 140 may display images arranged from the selected image up to an image disposed immediately before a next document separator. In other words, images displayed at this point are extracted as one document. Furthermore, images are displayed hierarchically as the detection result, images discriminated to correspond to document separators and the other images. An image to be displayed may be a thumbnail image (reduced image), an icon indicating the image or the like.

The modification target specification module 150 is connected to the criterion modification module 130, the display module 140 and the output module 160. The modification target specification module 150 accepts correction of the detection result displayed by the display module 140 through an operation performed by a user. The result of the correction is passed to the criterion modification module 130 and the output module 160. As a correction operation accepted at this point, an image not corresponding to a document separator is modified to an image corresponding to a document separator, or on the contrary, an image corresponding to a document separator is modified to an image not corresponding to a document separator. The detection result may be further modified based on the accepted correction operation.

The output module 160 is connected to the modification target specification module 150. The output module 160 outputs the correction result obtained by the modification target specification module 150 or outputs the detection result obtained by the separator detection module 120 when there is no need of correction by the modification target specification module 150. The detection result may be output as images. Herein, "outputting an image" includes, for example, printing an image with a printing device such as a printer, displaying an image on a display device such as a display, transmitting an image with an image transmitting device such as a facsimile, and writing an image in an image storing device of an image database or the like. It is noted that processing different among documents may be performed in outputting an image. For example, a security policy different among documents may be added. The security policy may be determined depending upon the kind of stamp imprint image put on each document. The kind of stamp imprint image may be recognized by the separator detection module 120.

Figure 2:
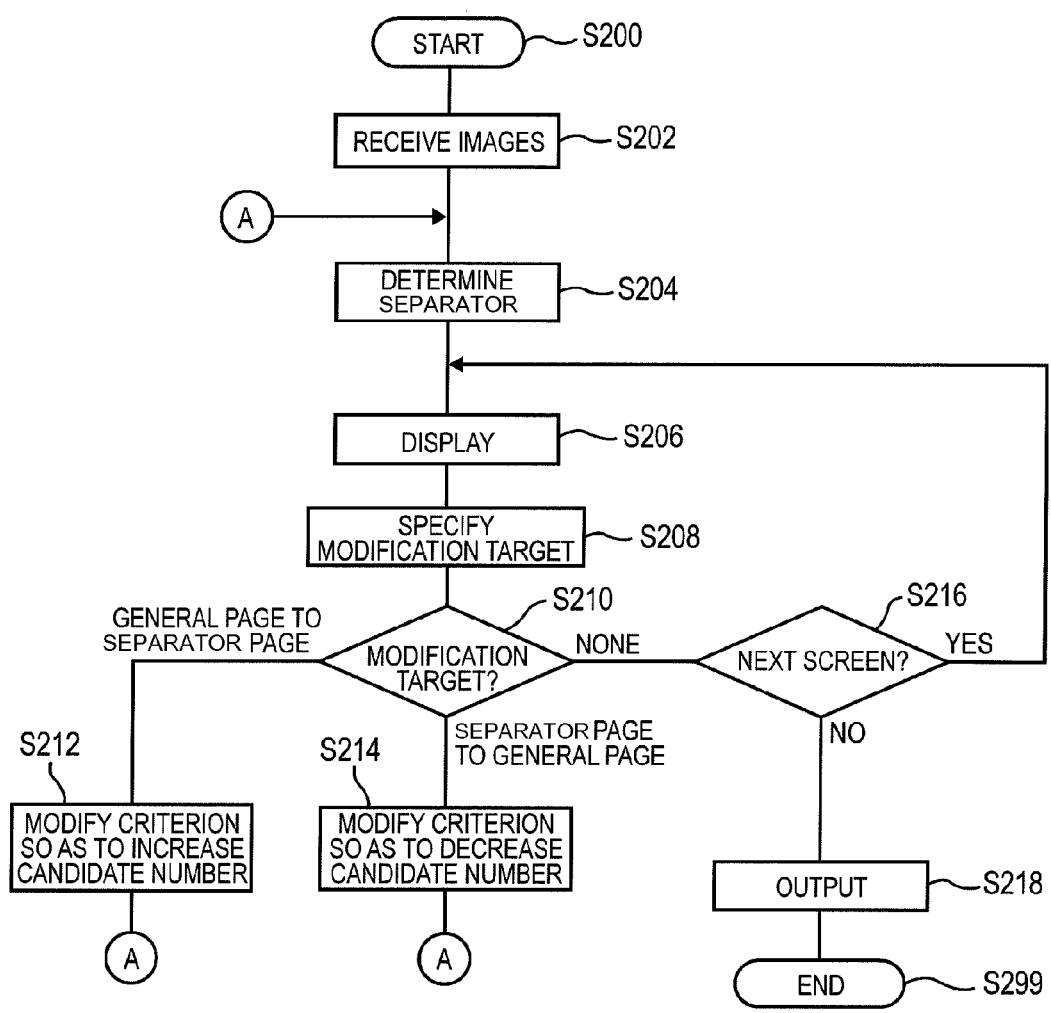
FIG. 2 is a flowchart illustrating exemplary processing of the exemplary embodiment.

FIG. 2 is a flowchart illustrating exemplary procedures in the processing of the exemplary embodiment.

In step S202, the image reception module 110 receives images.

Figure 3A:
FIGS. 3A and 3B are explanatory diagrams of exemplary stamp imprint images.
Figure 3B:

In step S204, the separator detection module 120 determines whether or not each of the images accepted in step S202 is an image corresponding to a document separator. Herein, description will be given by exemplifying a case where a stamp imprint image is disposed on the forefront page of each document. FIGS. 3A and 3B are explanatory diagrams illustrating examples of the stamp imprint image. As illustrated in the examples of FIGS. 3A and 3B, a stamp of kanji characters is placed (the kanji characters shown in FIGS. 3A and 3B mean "internal consumption"), and the stamp may be in a given color of red or the like. The example illustrated in FIG. 3A is comparatively easily recognized by using a method of pattern matching or the like, but since a stamp is frequently manually put, a stamp imprint image may be sometimes be formed unclear, for example, as illustrated in FIG. 3B. It is presumed that the recognition rate is lower in this case, and correction is necessary in such a case.

Figure 4:
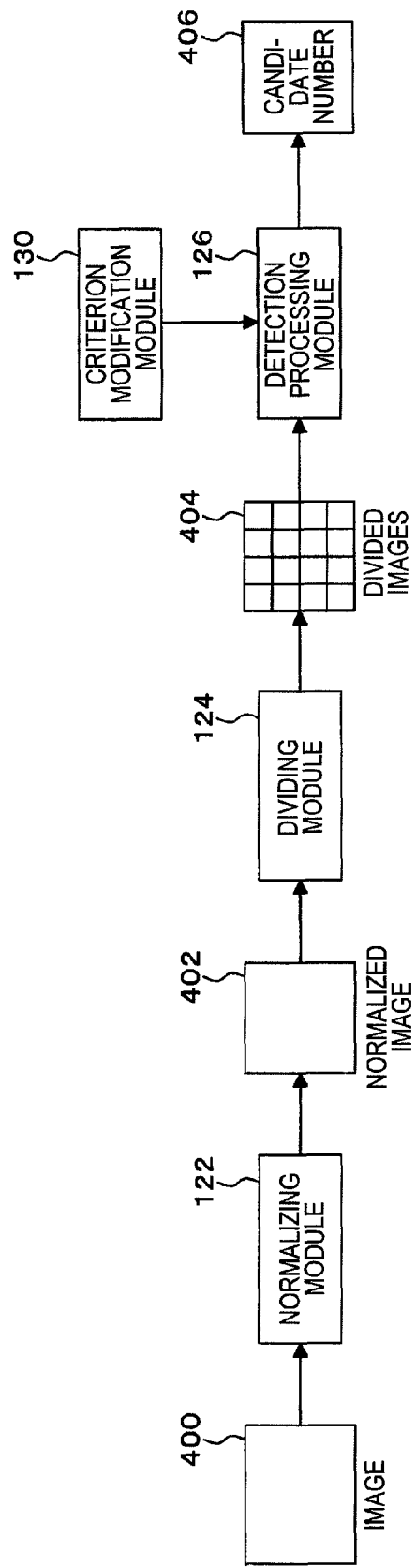
FIG. 4 is an explanatory diagram of exemplary processing performed by a separator detection module.

At this point, the detection processing performed by the separator detection module 120 will be described with reference to FIG. 4. FIG. 4 is an explanatory diagram illustrating exemplary processing performed by the separator detection module 120. The separator detection module 120 includes a normalizing module 122, a dividing module 124 and a detection processing module 126.

The normalizing module 122 receives an image 400 from the image reception module 110. Then, the normalizing module 122 normalizes the image 400 and passes the thus obtained normalized image 402 to the dividing module 124. For normalizing, for example, the aspect ratio of the image 400 is changed to a predetermined ratio. Furthermore, preprocessing (such as noise removal) may be additionally performed.

The dividing module 124 divides the normalized image 402 into blocks in a predetermined number (or size) and passes the thus divided images 404 to the detection processing module 126.

The detection processing module 126 determines, based on the criterion provided by the criterion modification module 130, whether or not each of the divided images 404 includes a stamp imprint image and outputs a candidate number 406 (i.e., the number of images including a stamp imprint image) as the detection result. This detection is performed by, for example, extraction of features of the number of pixels of red or the like disposed in a predetermined area, template matching of a stamp imprint image (which may be a partial image of the stamp imprint image such as a surrounding rectangle) or the like. As the criterion employed at this point, when the detection is performed by, for example, extracting the number of pixels of red or the like, a range of the number of pixels based on which it is determined that a stamp imprint image is included may be specified. Alternatively, when the detection is performed by template matching, a range of the matching degree may be specified. When the specified range is large, a stamp imprint image is determined to be included in more images, and when the specified range is small, a stamp imprint image is determined to be included in fewer images. Such modification of the criterion is performed by the criterion modification module 130.

Figure 5:
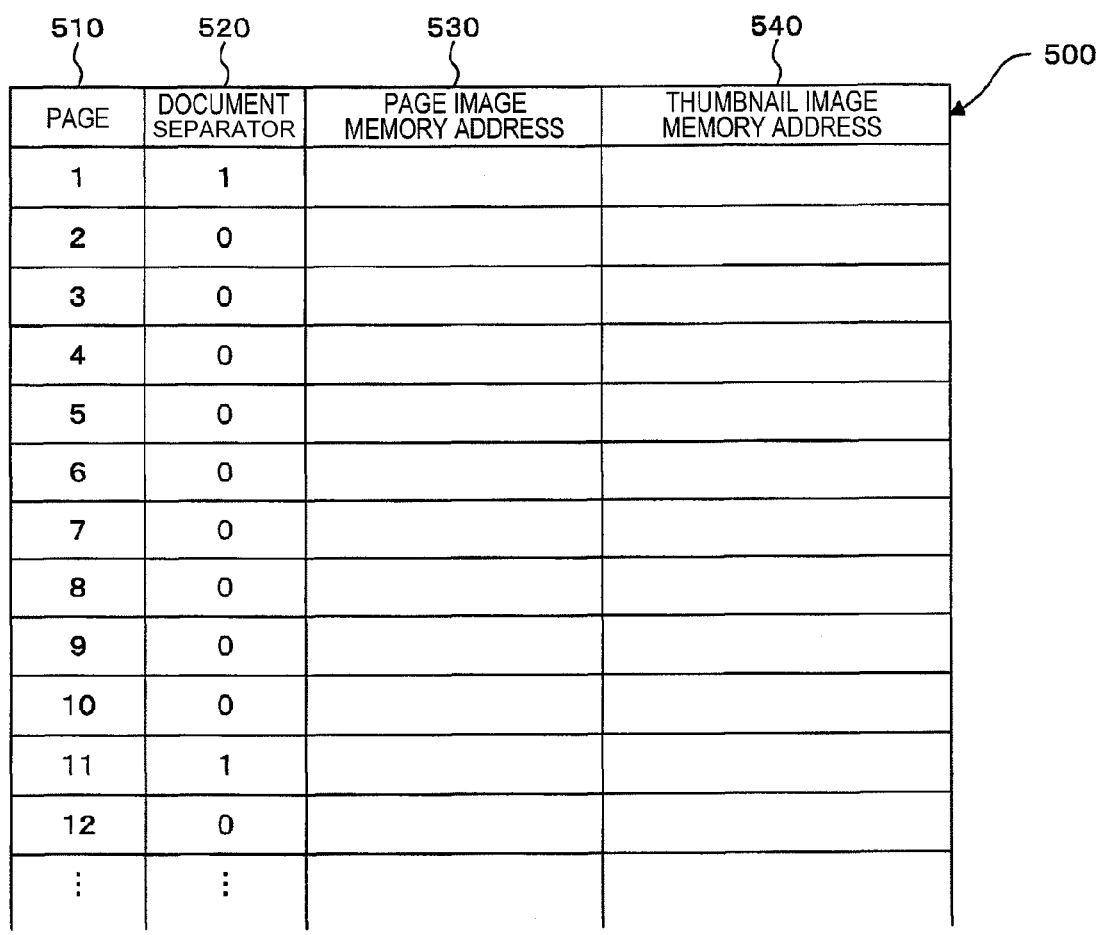
FIG. 5 is an explanatory diagram of an exemplary data structure of a detection result table.

The candidate number 406 may be output as a detection result table 500 as exemplarily illustrated in FIG. 5. FIG. 5 is an explanatory diagram illustrating an exemplary data structure of the detection result table 500. The detection result table 500 has a page column 510, a document separator column 520, a page image memory address column 530 and a thumbnail image memory address column 540. In the page column 510, page numbers successively provided to images accepted by the image reception module 110 are stored. In the document separator column 520, for example, "1" is stored in the case where it is determined by the separator detection module 120 that a stamp imprint image is included, and "0" is stored in the other case. The candidate number may be obtained by counting the number of "1" listed in the document separator column 520. In the page image memory address column 530, an address within a memory for storing each image accepted by the image reception module 110 is stored. In the thumbnail image memory address column 540, an address within a memory for storing a thumbnail image of the image is stored. It is noted that a thumbnail image may be created by the separator detection module 120 or the like.

In step S206, the display module 140 displays the detection result obtained in step S204 on a display or the like included in the image processing apparatus.

In step S208, the modification target specification module 150 accepts a correction operation performed by a user. The correction operation is, for example, an operation for modifying an image not corresponding to a document separator (namely, a general page image) to an image corresponding to a document separator (namely, a separator page image), or on the contrary, an operation for modifying an image corresponding to a document separator (namely, a separator page image) to an image not corresponding to a document separator (namely, a general page image).

In step S210, the criterion modification module 130 discriminates the operation accepted in step S208. When the accepted operation is the operation for modifying an image not corresponding to a document separator (namely, a general page image) to an image corresponding to a document separator (namely, a separator page image), the processing proceeds to step S212, when it is the operation for modifying an image corresponding to a document separator (namely, a separator page image) to an image not corresponding to a document separator (namely, a general page image), the processing proceeds to step S214, and in the other case, the processing proceeds to step S216.

In step S212, the criterion modification module 130 modifies the criterion so as to increase the number of images discriminated to correspond to document separators (i.e., the candidate number). Then, the processing returns to step S204 in which the separator detection module 120 performs its processing again.

In step S214, the criterion modification module 130 modifies the criterion so as to decrease the number of images discriminated to correspond to document separator (i.e., the candidate number). Then, the processing returns to step S204 in which the separator detection module 120 performs its processing again.

In step S216, the modification target specification module 150 determines whether or not a next screen (a next modification target) is displayed. When the next screen is displayed, the processing returns to step S206, and when not, the processing proceeds to step S218.

In step S218, the output module 160 outputs images gathered with respect to each document.

Figure 6:
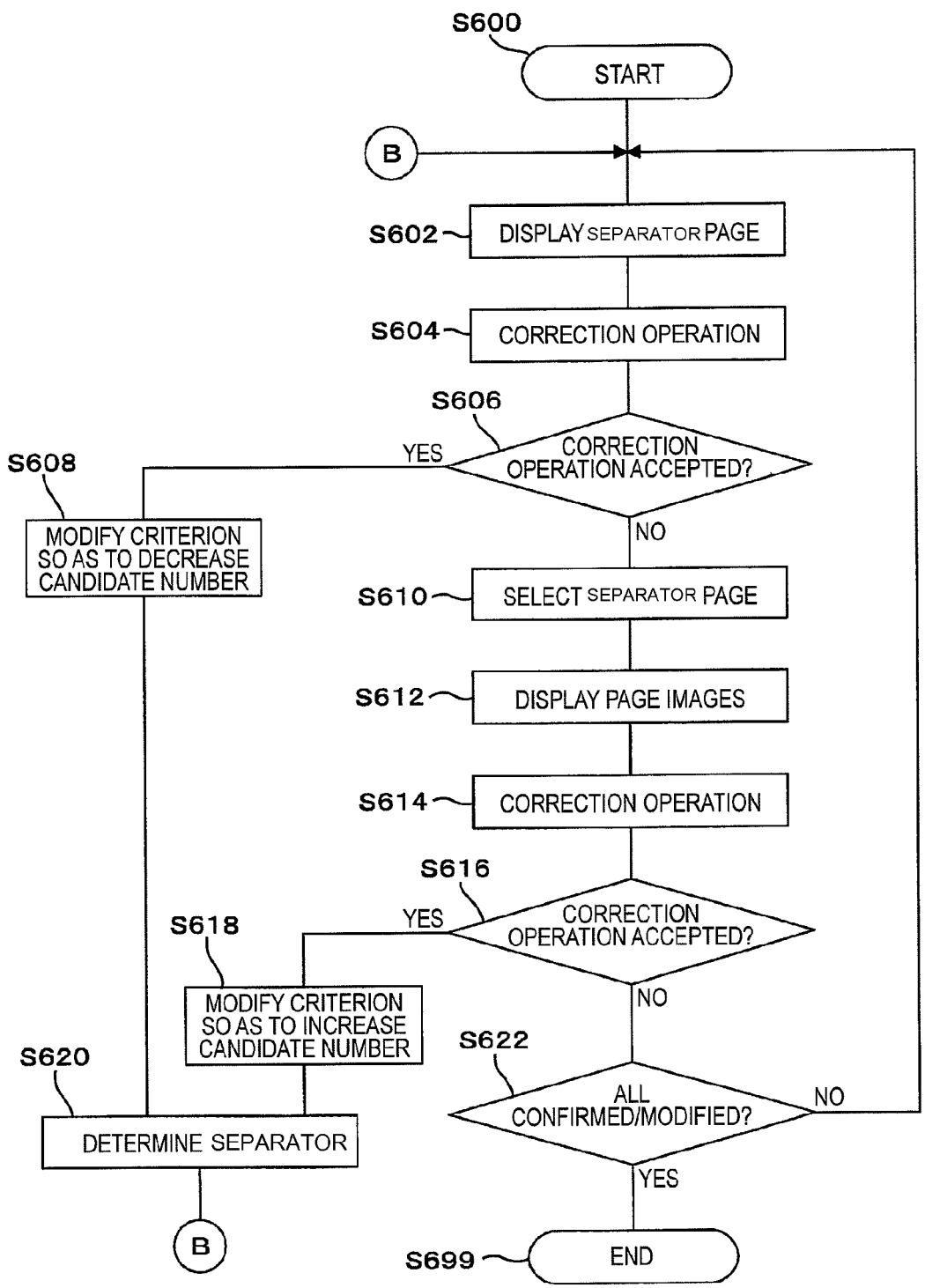
FIG. 6 is a flowchart illustrating exemplary correction processing.

FIG. 6 is a flowchart illustrating exemplary correction processing performed by the display module 140, the modification target specification module 150, the criterion modification module 130 and the separator detection module 120. Differently from the exemplary processing of FIG. 2, images corresponding to document separators are displayed first and images not corresponding to document separators are displayed as a subordinate layer in this exemplary processing.

Figure 7A:
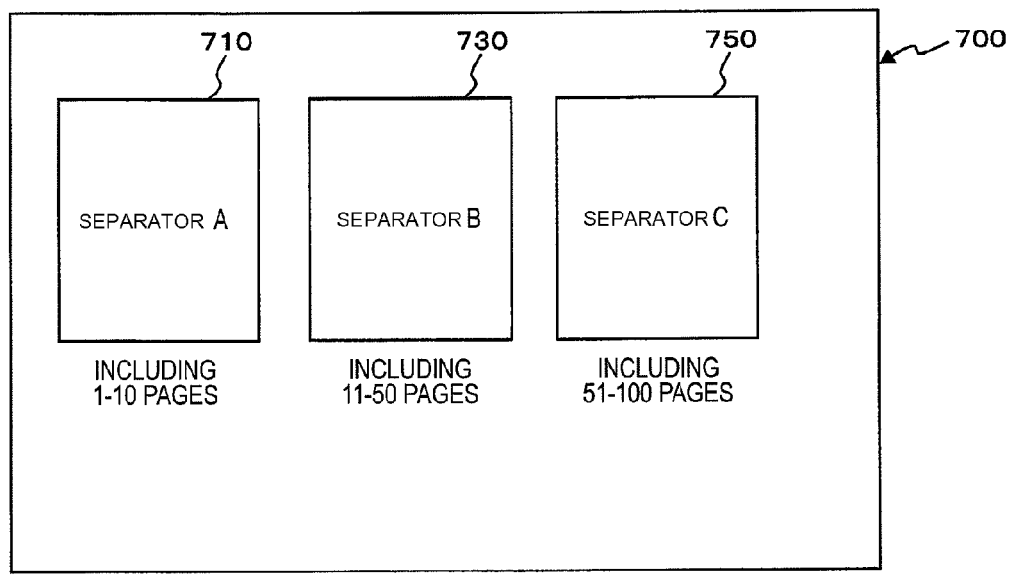
FIGS. 7A and 7B are explanatory diagrams illustrating exemplary images displayed on a display.

In step S602, the display module 140 displays images corresponding to document separators (namely, separator page images), for example, as in a display 700 exemplarily illustrated in FIG. 7A. In the display 700 exemplarily illustrated in FIG. 7A, a separator A710, a separator B730 and a separator C750 are displayed. In other words, the separator detection module 120 has determined that there are 3 images corresponding to document separators (namely, 3 documents), that the separator A710 includes 10 pages (including 9 images discriminated as general page images), that the separator B730 includes 40 pages (including 39 images discriminated as general page images), and that the separator C750 includes 50 pages (including 49 images discriminated as general page images).

In step S604, the modification target specification module 150 accepts the correction operation to be performed in displaying the images in step S602, namely, the correction operation for modifying an image corresponding to a document separator to an image not corresponding to a document separator.

In step S606, the modification target specification module 150 determines whether or not the correction operation for modifying an image corresponding to a document separator to an image not corresponding to a document separator has been accepted in step S604. When such an operation has been accepted, the processing proceeds to step S608, and when not, the processing proceeds to step S610.

In step S608, the criterion modification module 130 modifies the criterion so as to decrease the number of images discriminated to correspond to document separators (the candidate number). Then, the processing proceeds to step S620, in which the separator detection module 120 performs its processing again.

In step S610, the modification target specification module 150 accepts a selection operation performed by a user for the images corresponding to the document separators displayed in step S602.

Figure 7B:
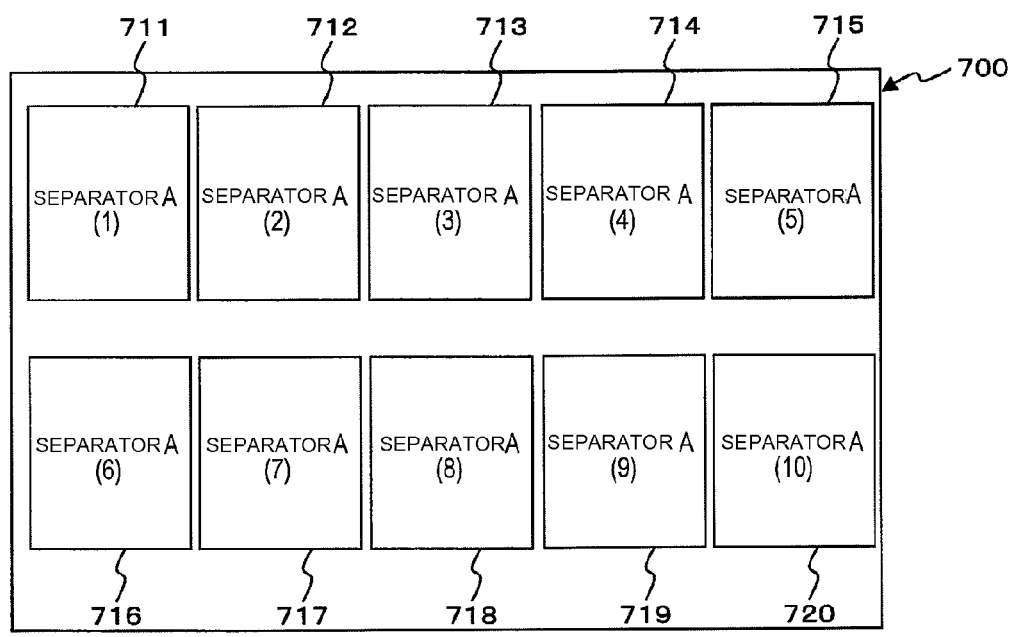

In step S612, the modification target specification module 150 displays images led by the image selected in step S610 and arranged before appearance of an image corresponding to a next document separator (namely, images of one document). Assuming that the separator A710 exemplarily illustrated in FIG. 7A is selected, images are displayed in the display 700 as exemplarily illustrated in FIG. 7B. In the display 700 exemplarily illustrated in FIG. 7B, 10 images (thumbnail images) arranged from a separator A(1)711 to a separator A(10)720 are displayed.

In step S614, the modification target specification module 150 accepts the correction operation to be performed in displaying the images in step S612, namely, the correction operation for modifying an image not corresponding to a document separator to an image corresponding to a document separator.

In step S616, the modification target specification module 150 determines whether or not the correction operation for modifying an image not corresponding to a document separator to an image corresponding to a document separator has been accepted in step S614. When such a correction operation has been accepted, the processing proceeds to step S618, and when not, the processing proceeds to step S622.

In step S618, the criterion modification module 130 modifies the criterion so as to increase the number of images discriminated to correspond to document separators (the candidate number). Then, the processing proceeds to step S620, in which the separator detection module 120 performs its processing again.

In step S620, the separator detection module 120 discriminates an image corresponding to a document separator based on the criterion having been modified in step S608 or step S618. Then, the processing returns to step S602.

In step S622, it is determined whether or not all images have been confirmed (or modified). When not, the processing returns to step S602.

Figure 8:
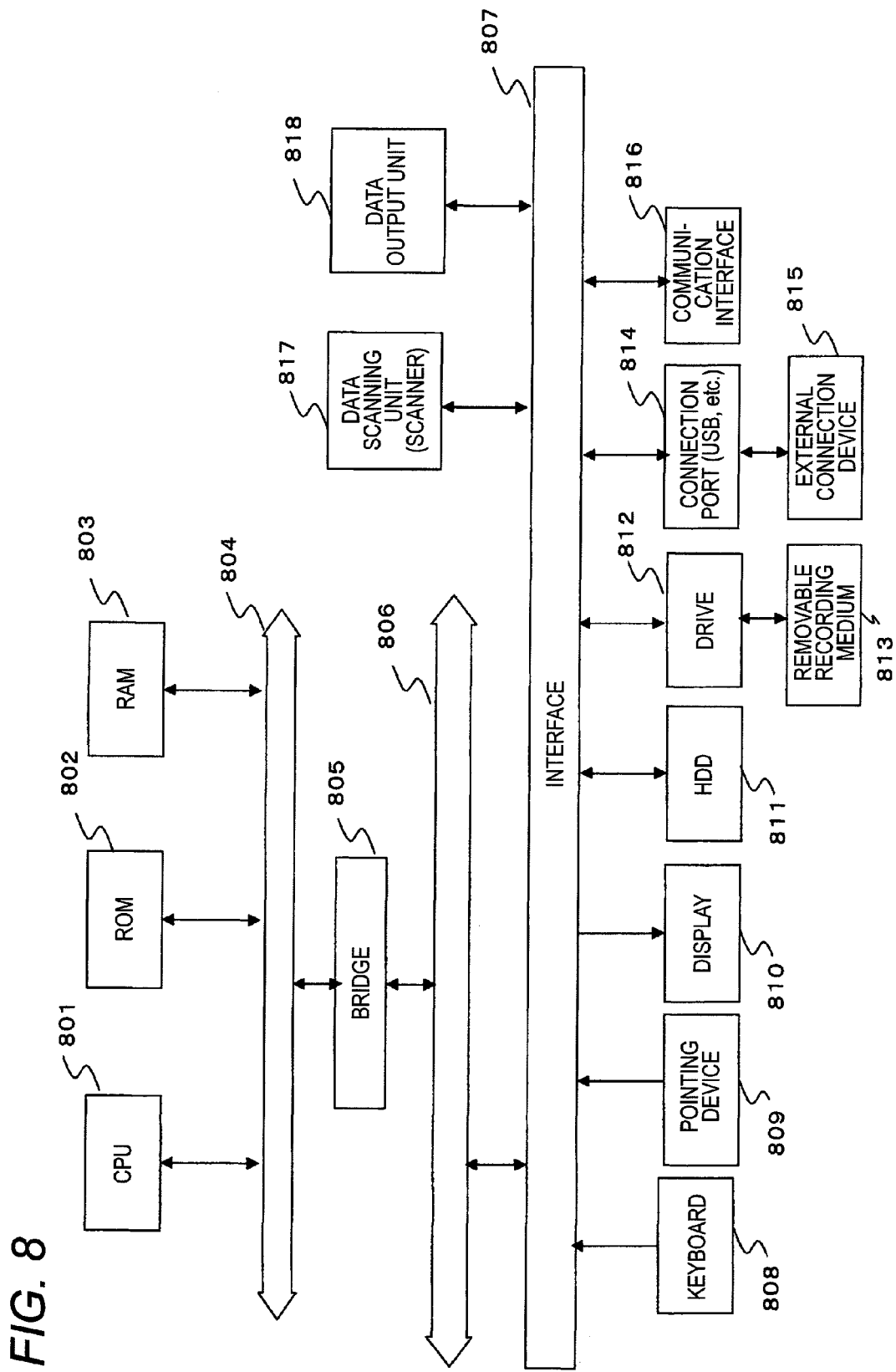
FIG. 8 is a block diagram illustrating exemplary hardware configuration of a computer for realizing the exemplary embodiment.

An exemplary hardware configuration for the image processing apparatus of the exemplary embodiment will be described with reference to FIG. 8. The configuration illustrated in FIG. 8 is attained by using, for example, a personal computer (PC) or the like and is an exemplary configuration including a data scanning unit 817 such as a scanner and a data output unit 818 such as a printer.

A central processing unit (CPU) 801 is a processor that performs processing in accordance with a computer program describing execution sequences of the various modules described above, namely, the separator detection module 120, the criterion modification module 130, the display module 140, the modification target specification module 150 and the like.

A read only memory (ROM) 802 stores a program, operation parameters and the like used by the CPU 801. A random access memory (RAM) 803 stores a program used in execution of the CPU 801 and parameters appropriately changed during the execution. They are connected to one another through a host bus 804 including a CPU bus or the like.

The host bus 804 is connected to an external bus 806 such as a Peripheral Component Interconnect/Interface (PCI) bus through a bridge 805.

A keyboard 808 and a pointing device 809 such as a mouse are input devices operated by a user. A display 810 is a liquid crystal display, a CRT (Cathode Ray Tube) or the like, and displays various information as text or image information.

An HDD (Hard Disk Drive) 811 contains a hard disk, drives the hard disk and records or reproduces a program executed by the CPU 801 or information. The hard disk stores images accepted by the image reception module 110, thumbnail images, results of the processing and the like. The hard disk further stores a variety of computer programs such as other various data processing programs.

A drive 812 reads data or a program recorded in a removable recording medium 813 loaded in the image processing apparatus, such as a magnetic disk, an optical disk, a magneto-optical disk or a semiconductor memory, and supplies the read data or program to the RAM 803 connected through an interface 807, the external bus 806, the bridge 805 and the host bus 804. The removable recording medium 813 can be also used as a data memory area similar to the hard disk.

A connection port 814 is a port for connecting an external connection device 815 and has a connection interface of USB or IEEE 1394. The connection port 814 is connected to the CPU 801 and the like through the interface 807, the external bus 806, the bridge 805, the host bus 804 and the like. A communication interface 816 is connected to a network and executes external data communication processing. The data scanning unit 817 is, for example, a scanner and executes document reading processing. The data output unit 818 is, for example, a printer and executes document data outputting processing.

Incidentally, the hardware configuration of the image processing apparatus illustrated in FIG. 8 is merely an example of the configuration, and the present exemplary embodiment is not limited to the configuration of FIG. 8 but any configuration capable of executing the modules described in the exemplary embodiment can be employed. For example, a part of the modules may be constituted by dedicated hardware (such as an Application Specific Integrated Circuit (ASIC)), a part of the modules may be disposed in an external system connected through a communication line, or plural systems each as illustrated in FIG. 8 may be connected to one another through communication lines for performing cooperative operations. Furthermore, the image processing apparatus may be incorporated into a copying machine, a facsimile machine, a scanner, a printer or a multifunction machine (that is, an image processing apparatus having two or more functions out of functions of a scanner, a printer, a copying machine and a facsimile machine).

The aforementioned program may be stored in a recording medium to be provided, or the program may be provided through a communication means. In this case, for example, the above-described program may be regarded as a "computer-readable medium storing the program".

Herein, a "computer-readable medium storing a program" means a program-recorded computer-readable medium to be used for the purpose of installation, execution and marketing of a program.

It is noted that a recording medium includes, for example, a digital versatile disk (DVD) according to the standards settled by the DVD Forum, such as a DVD-R, a DVD-RW or a DVD-RAM and a DVD according to the standards settled by DVD+RW, such as a DVD+R or DVD+RW, a compact disk (CD) such as a read only memory (CD-ROM), a CD recordable (CD-R) or a CD rewritable (CD-RW), a Blu-ray Disc (registered trademark), a magneto-optical disk (MO), a flexible disk (PD), a magnetic tape, a hard disk, a read only memory (ROM), an electrically erasable and programmable read only memory (EEPROM), a flash memory and a random access memory (RAM).

The above-described program or a part thereof may be recorded in the recording medium for storage, marketing or the like. Alternatively, it may be transferred through communication with a wired network or a wireless network such as a local area network (LAN), a metropolitan area network (MAN), a wide area network (WAN), the Internet, an intranet or an extranet, or through a transmission medium obtained by combining them, or may be carried on a carrier wave.

Moreover, the above-described program may be a part of another program, or may be recorded in a recording medium together with another program. Alternatively, it may be recorded dividedly in plural recording media. Also, it may be recorded in any recoverable format of compression, encryption or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image processing apparatus comprising:
   an image reception unit that receives a plurality of images;
   a determination unit that determines whether or not each of the images received by the image reception unit corresponds to a separator image that represents a separator of a document based on a criterion and outputs a detection result;
   a display unit that displays the detection result output by the determination unit, the detection result comprising a first image, from among the plurality of images, that is determined as corresponding to the separator image by the determination unit;
   a correction accepting unit that accepts correction of the detection result displayed by the display unit in accordance with an operation performed by a user; and
   a criterion modifying unit that modifies the criterion in response to the correction accepting unit accepting the correction,
   wherein, in response to the correction accepting unit accepting the correction and the criterion modifying unit modifying the criterion, the determination unit re-determines whether or not each of the images received by the image reception unit corresponds to the separator image based on the modified criterion, and
   wherein in response to the correction accepting unit not accepting any correction instruction from the user and in response to the user selecting the displayed first image, the display unit displays the first image and a second image, wherein the second image is not determined as corresponding to the separator image by the determination unit.

2. The image processing apparatus according to claim 1, wherein the criterion modifying unit modifies the criterion so that the images received by the image reception unit becomes more likely be determined to correspond to the separator image when the correction accepted by the correction accepting unit is to correct the detection result from a non non-separator image to the separator image.

3. The image processing apparatus according to claim 1, wherein the criterion modifying unit modifies the criterion so that the images received by the image reception unit becomes less likely be determined to correspond to the separator image when the correction accepted by the correction accepting unit is to correct the detection result from the separator image to a non-separator image.

4. The image processing apparatus according to claim 1, wherein the display unit displays images, including the first image, that are determined to correspond to the separator image and, when one of the images being displayed is selected, displays a set of images starting from the selected image through an image immediately prior to a next image that is determined to correspond to the separator image.

5. The image processing apparatus according to claim 2, wherein the display unit displays images, including the first image, that are determined to correspond to the separator image and, when one of the images being displayed is selected, displays a set of images starting from the selected image through an image immediately prior to a next image that is determined to correspond to the separator image.

6. The image processing apparatus according to claim 3, wherein the display unit displays images, including the first image, that are determined to correspond to the separator image and, when one of the images being displayed is selected, displays a set of images starting from the selected image through an image immediately prior to a next image that is determined to correspond to the separator image.

7. The image processing apparatus according claim 1, wherein the separator image includes a stamp imprint image.

8. The image processing apparatus according to claim 2, wherein the separator image includes a stamp imprint image.

9. The image processing apparatus according to claim 3, wherein the separator image includes a stamp imprint image.

10. The image processing apparatus according to claim 4, wherein the separator image includes a stamp imprint image.

11. The image processing apparatus according to claim 5, wherein the separator image includes a stamp imprint image.

12. The image processing apparatus according to claim 6, wherein the separator image includes a stamp imprint image.

13. A method for performing image processing, the method comprising: receiving a plurality of images; determining, using at least one processor, whether or not each of the images being received corresponds to a separator image that represents a separator of a document based on a criterion to output a detection result; displaying the detection result, the detection result comprising a first image, from among the plurality of images, that is determined as corresponding to the separator image; accepting correction of the detection result being displayed in accordance with an operation performed by a user; modifying the criterion in response to accepting the correction; re-determining, using the at least one processor, in response to accepting the correction and modifying the criterion, whether or not each of the images being received corresponds to the separator image based on the modified criterion; and displaying, in response to not receiving any correction instruction from the user and in response to the user selecting the displayed first image, the first image and a second image, wherein the second image is not determined as corresponding to the separator image.

14. A non-transitory computer readable medium storing a program causing a computer to execute a process for performing image processing, the process comprising:

receiving a plurality of images;

determining whether or not each of the images being received corresponds to a separator image that represents a separator of a document based on a criterion to output a detection result;

displaying the detection result, the detection result comprising a first image, from among the plurality of images, that is determined as corresponding to the separator image;

accepting correction of the detection result being displayed in accordance with an operation performed by a user;

modifying the criterion in response to accepting the correction;

re-determining, in response to accepting the correction and modifying the criterion, whether or not each of the images being received corresponds to the separator image based on the modified criterion; and displaying, in response to not receiving any correction instruction from the user and in response to the user selecting the displayed first image, the first image and a second image, wherein the second image is not determined as corresponding to the separator image.

* * * * *